(12) United States Patent
Yamashita (10) Patent No.: US 9,685,873 B2
(45) Date of Patent: Jun. 20, 2017

(54) POWER SUPPLY DEVICE, IMAGE FORMING DEVICE, AND ELECTRONIC APPLIANCE

(71) Applicant: Tomofumi Yamashita, Saga (JP)

(72) Inventor: Tomofumi Yamashita, Saga (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/786,720

(22) PCT Filed: Apr. 25, 2014

(86) PCT No.: PCT/JP2014/062209
§ 371 (c)(1),
(2) Date: Oct. 23, 2015

(87) PCT Pub. No.: WO2014/175468
PCT Pub. Date: Oct. 30, 2014

(65) Prior Publication Data
US 2016/0065076 A1    Mar. 3, 2016

(30) Foreign Application Priority Data

Apr. 25, 2013 (JP) ................................. 2013-093077

(51) Int. Cl.
*H02M 3/335* (2006.01)
*G03G 15/00* (2006.01)
*H02M 1/34* (2007.01)

(52) U.S. Cl.
CPC .... *H02M 3/33507* (2013.01); *G03G 15/5004* (2013.01); *G03G 15/80* (2013.01);
(Continued)

(58) Field of Classification Search
CPC .. H02M 3/325; H02M 3/335; H02M 3/33507; H02M 3/33515; H02M 3/33576;
(Continued)

(56) References Cited

U.S. PATENT DOCUMENTS 5,615,094 A    3/1997 Cosentino et al.
5,805,432 A *  9/1998 Zaitsu ..................... H02M 1/34
                                                    363/16

(Continued)

FOREIGN PATENT DOCUMENTS

DE    4008652        9/1991
EP    1760867 A2     3/2007
(Continued)

OTHER PUBLICATIONS

Apr. 5, 2016 European Search Report in corresponding European Patent Application No. EP 14788520.6.

*Primary Examiner* — Adolf Berhane
(74) *Attorney, Agent, or Firm* — Cooper & Dunham LLP (57) ABSTRACT

This invention is concerning a power supply device that includes a cut-off unit configured to cut off voltage to be applied to a primary winding of a transformer and a coil added in series with the primary winding of the transformer, a first circuit configured to cause, in a case where the voltage to be applied is cut off by the cut-off unit, current to flow in such a way that energy accumulated in the transformer is led to a capacitor, and a second circuit configured to clamp, in a case where the voltage to be applied is cut off by the cut-off unit, voltage of the primary winding and the coil.

15 Claims, 13 Drawing Sheets

(52) U.S. Cl.
CPC ......... H02M 1/34 (2013.01); H02M 3/33569 (2013.01); *H02M 2001/342* (2013.01); *Y02B 70/1491* (2013.01)

(58) Field of Classification Search
CPC ............ H02M 3/33592; H02M 3/337; H02M 3/3372; H02M 3/3374; H02M 3/3376; H02M 3/3378; H02M 7/537; H02M 7/53806; H02M 7/5381
USPC .... 363/16, 21.12, 21.13, 21.14, 24, 25, 131, 363/133
See application file for complete search history.

(56) References Cited

U.S. PATENT DOCUMENTS

| | | | | |
|---|---|---|---|---|
| 6,055,162 | A * | 4/2000 | Tarrillo | H02M 3/33576 363/133 |
| 6,191,960 | B1 * | 2/2001 | Fraidlin | H02M 3/3353 363/25 |
| 6,324,077 | B1 * | 11/2001 | Lopresti | H02M 3/33592 363/16 |
| 6,349,044 | B1 * | 2/2002 | Canales-Abarca | H02M 1/34 363/134 |
| 7,061,777 | B2 * | 6/2006 | Zeng | H02M 3/33569 363/134 |
| 8,331,113 | B2 * | 12/2012 | Tang | H02M 1/425 323/266 |
| 8,711,580 | B2 * | 4/2014 | Zhang | H02M 1/32 323/901 |
| 2002/0034085 | A1 * | 3/2002 | Huang | H02M 3/33569 363/25 |
| 2007/0029982 | A1 * | 2/2007 | Chen | H02M 3/33569 323/225 |
| 2009/0175054 | A1 | 7/2009 | Appel et al. | |
| 2009/0196073 | A1 | 8/2009 | Nakahori | |
| 2011/0150521 | A1 | 6/2011 | Uchiyama et al. | |
| 2011/0227554 | A1 * | 9/2011 | Hokomoto | H01L 21/823487 323/311 |
| 2011/0317452 | A1 * | 12/2011 | Anguelov | H02M 3/33584 363/21.02 |
| 2011/0317454 | A1 | 12/2011 | Lin et al. | |
| 2015/0381065 | A1 * | 12/2015 | Yonezawa | H03K 17/691 363/25 |
| 2016/0006355 | A1 * | 1/2016 | Visser | H01F 27/38 363/25 |

FOREIGN PATENT DOCUMENTS

| | | |
|---|---|---|
| JP | 60-091863 | 5/1985 |
| JP | 60-148374 | 8/1985 |
| JP | 06-062568 | 3/1994 |
| JP | 11-178335 | 7/1999 |
| JP | 2001-112245 | 4/2001 |
| JP | 2008-535470 | 8/2008 |
| JP | 2012-120399 | 6/2012 |

* cited by examiner

FIG.15

POWER SUPPLY DEVICE, IMAGE FORMING DEVICE, AND ELECTRONIC APPLIANCE

TECHNICAL FIELD

The present invention relates to a power supply device, an image forming device, and an electronic appliance.

BACKGROUND ART

With respect to a switching power supply used as a power supply of an electronic appliance, there is a demand for a reduction in the loss (heat generation) and an increase in the efficiency. Moreover, also with respect to an image forming device for which load variation is great and which stays in a wait state for a long time, an increase in the efficiency of the power supply device is being studied.

For example, Patent document 1 discloses a switching power supply device which includes a flyback circuit of a diode and a capacitor on a secondary side of a forward converter transformer, and which switches to a flyback method when a load current drops to or below a predetermined value, and extracts energy accumulated in the converter transformer as flyback output.

However, there is a problem that it is difficult to achieve both higher efficiency and miniaturization of the power supply device.

CITATION LIST

Patent Literature

Patent document 1: Japanese Patent Application Laid-open No. 1994-062568.

DISCLOSURE OF INVENTION

Problem to be Solved by the Invention

The present invention is made in consideration of the above, and its object is to provide a power supply device capable of achieving both higher efficiency and miniaturization, an image forming device, and an electronic appliance.

Means for Solving Problem

To achieve the object, a power supply device according to the present invention comprises: a cut-off unit configured to cut off voltage to be applied to a primary winding of a transformer and a coil added in series with the primary winding of the transformer; a first circuit configured to cause, in a case where the voltage to be applied is cut off by the cut-off unit, current to flow in such a way that energy accumulated in the transformer is led to a capacitor; and a second circuit configured to clamp, in a case where the voltage to be applied is cut off by the cut-off unit, voltage of the primary winding and the coil.

An image forming device according to the present invention comprises an image forming unit configured to form an image, a control unit configured to control the image forming unit, and the above-mentioned power supply device.

An electronic appliance according to the present invention comprises the above-mentioned power supply device.

Effect of the Invention

According to the present invention, an effect that both higher efficiency and miniaturization may be achieved is obtained.

BEST MODES FOR CARRYING OUT THE INVENTION

Background

First, a background leading to the present invention will be described. Currently, power consumption of an electronic appliance is being visualized by a typical electricity consumption (TEC) value. The TEC value is a value indicating the amount of power consumption (kWh) per week in a model case. Moreover, the TEC value is a criterion value for complying with "International Energy Star Program" of the Energy Conservation Center, Japan".

Figure 1:
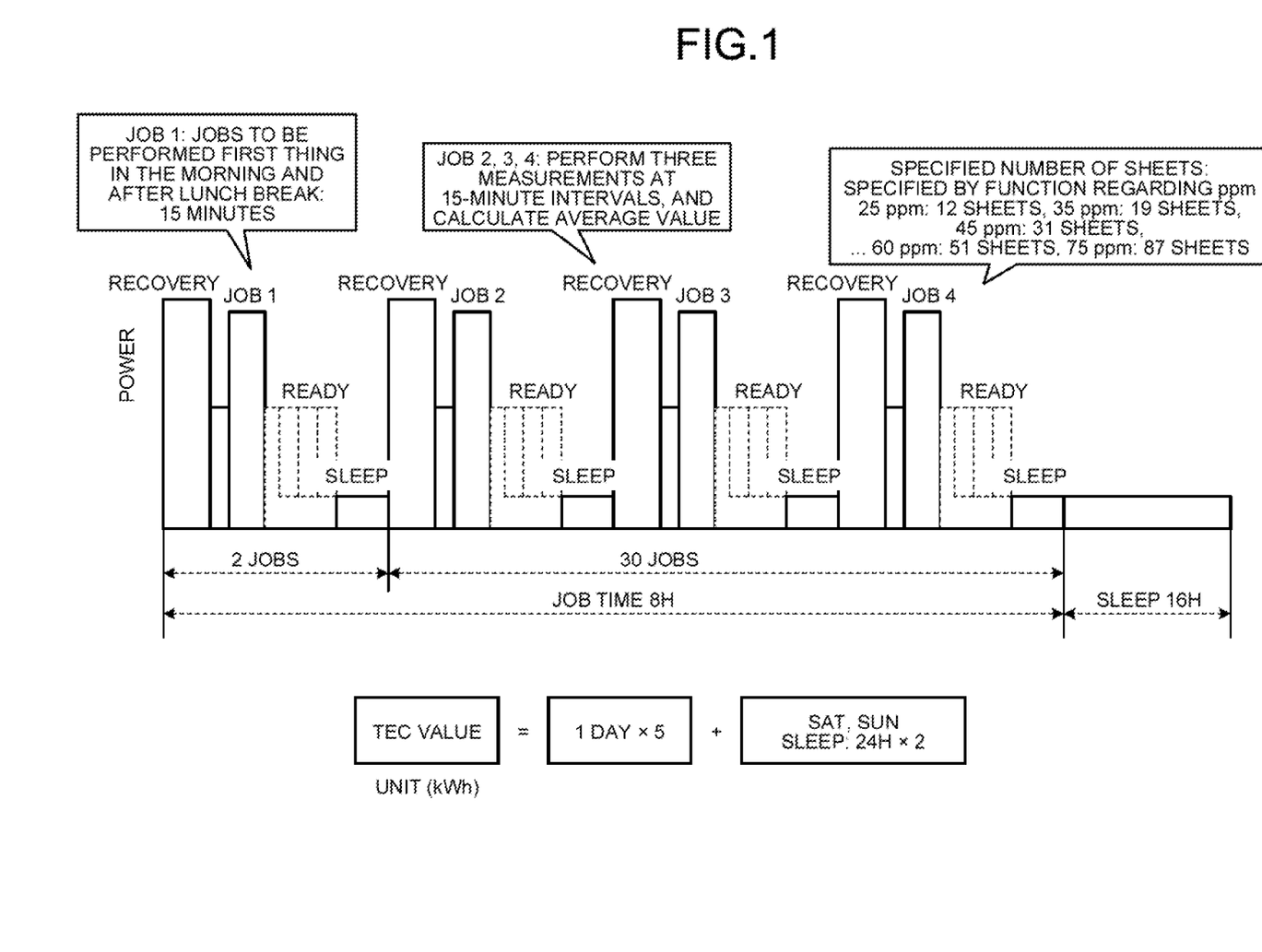
FIG. 1 is a diagram illustrating an example of calculation of a TEC value of an image forming device.

FIG. 1 is a diagram illustrating an example of calculation of a TEC value of an image forming device. With respect to an image forming device such as a printer or a multifunction peripheral, a mode of use in an average office where one weekday is divided into 8 hours of operation time (job time) and 16 hours of sleeping is assumed, for example.

In the job time, the image forming device performs two jobs (JOB 1), first thing in the morning and after the lunch break, for example. Here, the image forming device performs an operation of consuming power in recovery and a job, and falling into sleep after a ready state. Additionally, the image forming device is at the rated power during a job, is in standby power during ready, and saves power in sleep.

Then, the image forming device performs JOB 2, 3 and 4 at 15-minute intervals, repeats the same ten times, and performs 30 jobs in total. In the three measurements of power for JOB 2, 3 and 4, an average value of power consumption is calculated. Also, in a printing operation, power consumption is specified by a function regarding a specified number of sheets indicated by ppm (paper per minute).

Then, the TEC value is calculated by a sum of power for five times the weekday (five weekdays) and power for sleep in Saturday and Sunday (24 h×2).

As described above, the power usage of the image forming device spans over a wide range from a light load to a heavy load. Also, the period of sleep (light load of about 50 mA to 200 mA) of the image forming device is extremely long. That is, to improve the TEC value, a wide load range of 100 times or more, from a job (about 12 A to 20 A) to sleep (about 50 mA to 200 mA), has to be highly efficiently maintained.

Figure 2:
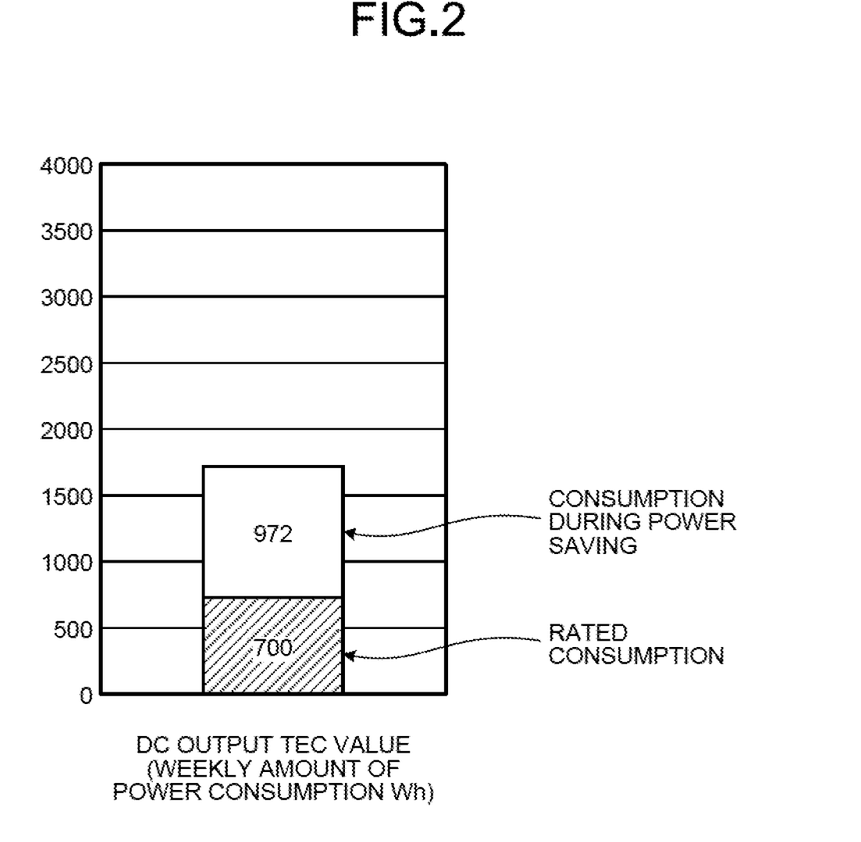
FIG. 2 is a graph illustrating a TEC value of the rating and a TEC value in a power saving period.

FIG. 2 is a graph illustrating a TEC value of the rating and a TEC value in a power saving period. As illustrated in FIG. 2, the weekly amount of power consumption in a power saving period is greater than the weekly amount of power consumption of the rating. That is, to improve the TEC value, the efficiency especially in the sleep period, which is long, has to be increased. Also, the standard amount of $CO_2$ emissions is calculated from the TEC value based on the basic unit of the Ministry of the Environment "0.555 kg-$CO_2$/1 kWh". That is, the TEC value is directly related to environmental issues.

Figure 3:
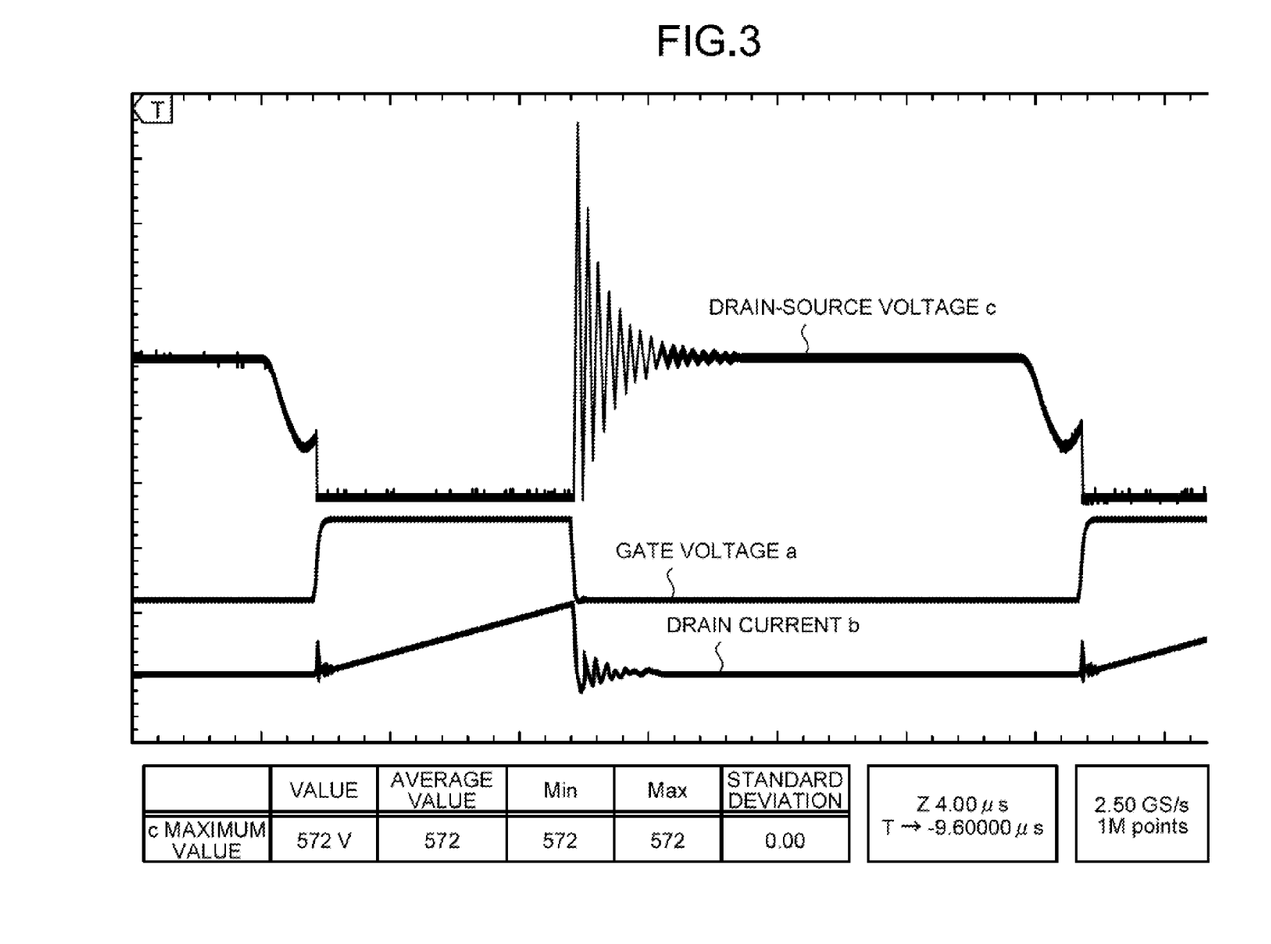
FIG. 3 is a graph illustrating an example of a change in voltage in the case where an electronic switch of a flyback converter not including a snubber circuit is operated.

Next, an operation example of a flyback converter will be described. The flyback converter is simple, with a small number of components, and has an advantage that the input voltage range is wide. FIG. 3 is a graph illustrating an example of a change in voltage in the case where an electronic switch (FET) of a flyback converter (see FIG. 12) not including a snubber circuit is operated. As illustrated in FIG. 3, when the electronic switch (FET) is turned off (gate voltage a is switched from High to Low), high voltage of 572 V is generated as drain-source voltage c.

Figure 4:
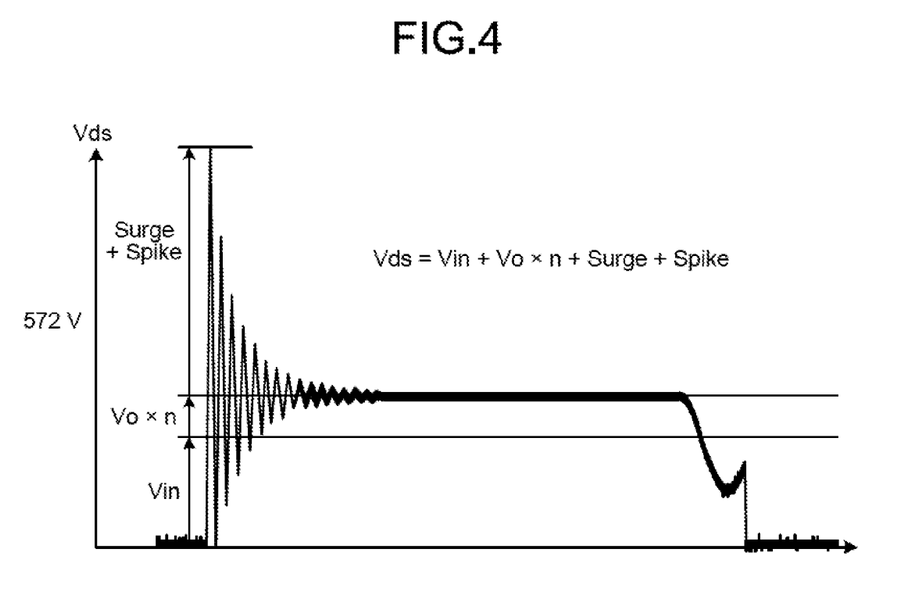
FIG. 4 is a graph illustrating in detail drain-source voltage c illustrated in FIG. 3.

FIG. 4 is a graph illustrating in detail the drain-source voltage c illustrated in FIG. 3. As illustrated in FIG. 4, Vds (drain-source voltage c) is 572 V, and includes powerful surges and spikes.

Figure 5:
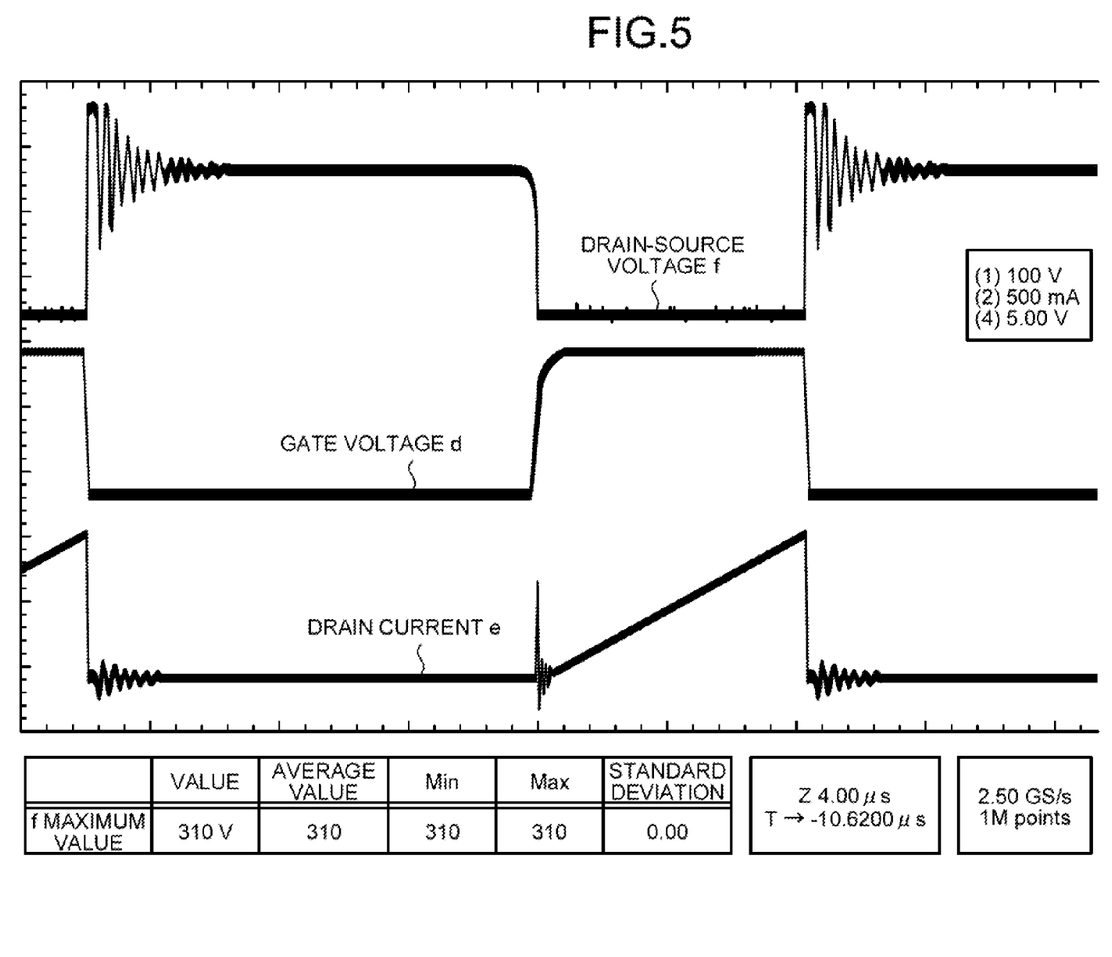
FIG. 5 is a graph illustrating an example of a change in voltage in the case where an electronic switch of a flyback converter including a snubber circuit is operated.

FIG. 5 is a graph illustrating an example of a change in voltage in the case where an electronic switch (FET) of a flyback converter including a snubber circuit is operated. As illustrated in FIG. 5, if a provided snubber circuit suppresses the surges, drain-source voltage f is suppressed to 310 V. That is, damage to the electronic switch itself or peripheral electronic components is prevented, and the electromagnetic noises are minimized. However, in this case, the surge energy is merely dissipated as heat, and the efficiency is not improved.

Figure 6:
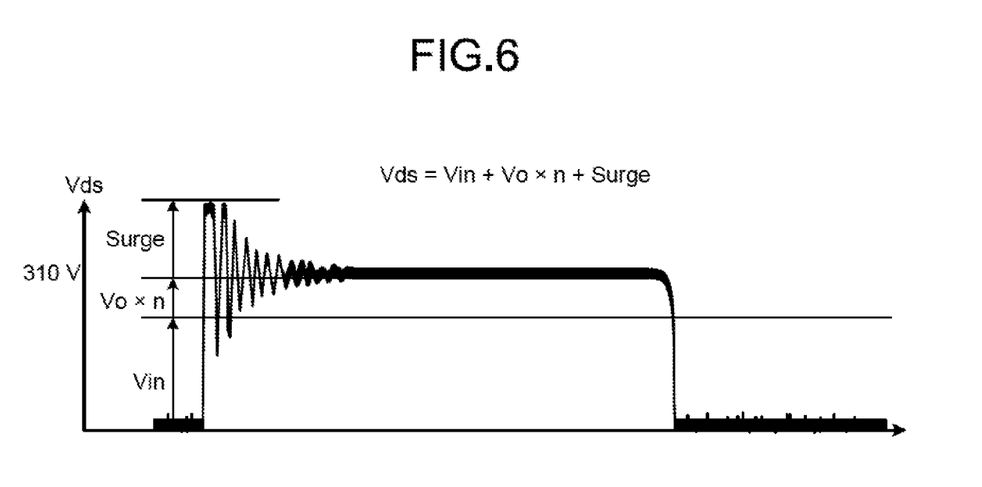
FIG. 6 is a graph illustrating in detail drain-source voltage f illustrated in FIG. 5.

FIG. 6 is a graph illustrating in detail the drain-source voltage f illustrated in FIG. 5. As illustrated in FIG. 6, Vds (drain-source voltage f) is 310 V. Here, the surges are clamped and removed, but the spikes remain. Also, the surge energy is dissipated as heat, but the efficiency is not improved.

First Embodiment

Figure 7:
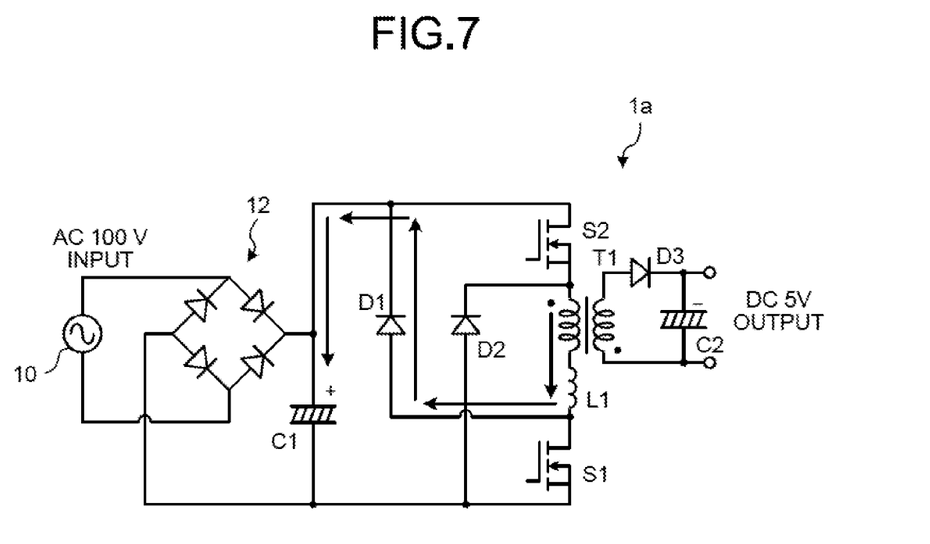
FIG. 7 is a diagram illustrating a structure example of a power supply device according to a first embodiment.

Next, a first embodiment of the power supply device will be described in detail. FIG. 7 is a diagram illustrating a structure example of a power supply device 1*a* according to the first embodiment. As illustrated in FIG. 7, the power supply device 1*a* is a flyback power supply device including a bridge rectifier (diode) 12 to which an AC power supply 10 of input of 100 V, for example, is connected, and a power converter transformer (flyback transformer) T1.

An electrolytic capacitor C1, a first diode D1, a second diode D2, a first electronic switch S1, a second electronic switch S2, and a coil L1 are provided on the primary side of the power converter transformer T1. Also, a third diode D3 and an electrolytic capacitor C2 are provided on the secondary side of the power converter transformer T1.

The coil L1 is a coil for generating energy, added in series with a primary winding of the power converter transformer T1. Additionally, the inductor of the coil L1 is set to a value that would not be affected by leakage inductance. The electrolytic capacitor C1 is provided to recover (accumulate) surge energy.

The first electronic switch S1 is provided at one end of the primary winding of the power converter transformer T1. The second electronic switch S2 is provided at one end of the coil L1. Furthermore, the first electronic switch S1 and the second electronic switch S2 form a cut-off unit for cutting off voltage to be applied to the primary winding and the coil L1 of the power converter transformer T1. Also, at least one of the first electronic switch S1 and the second electronic switch S2 also includes a function for turning on the switch so as to accumulate energy.

In the case where the voltage to be applied to the primary winding and the coil L1 of the power converter transformer T1 is cut off by the first electronic switch S1 and the second electronic switch S2, the first diode D1 causes current to flow in such a way that energy accumulated in the power converter transformer T1 is led to the electrolytic capacitor C1.

In the case where the voltage to be applied to the primary winding and the coil L1 of the power converter transformer T1 is cut off by the first electronic switch S1 and the second electronic switch S2, the second diode D2 clamps the voltage of the primary winding and the coil L1 of the power converter transformer T1.

The third diode D3 and the electrolytic capacitor C2 are provided on the secondary side of the power converter transformer T1. The third diode D3 is a Schottky barrier diode, for example. The output voltage on the secondary side of the power converter transformer T1 is DC 5 V.

As described above, the power supply device 1*a* has a single-stage structure (one converter type). Also, the power supply device 1*a* is capable of highly efficiently supplying power for a wide voltage range from a power-saving mode to a rated mode. Moreover, the power supply device 1*a* can be miniaturized to about ⅕ the capacity of a double-stage structure (two converter type), for example.

Figure 8:
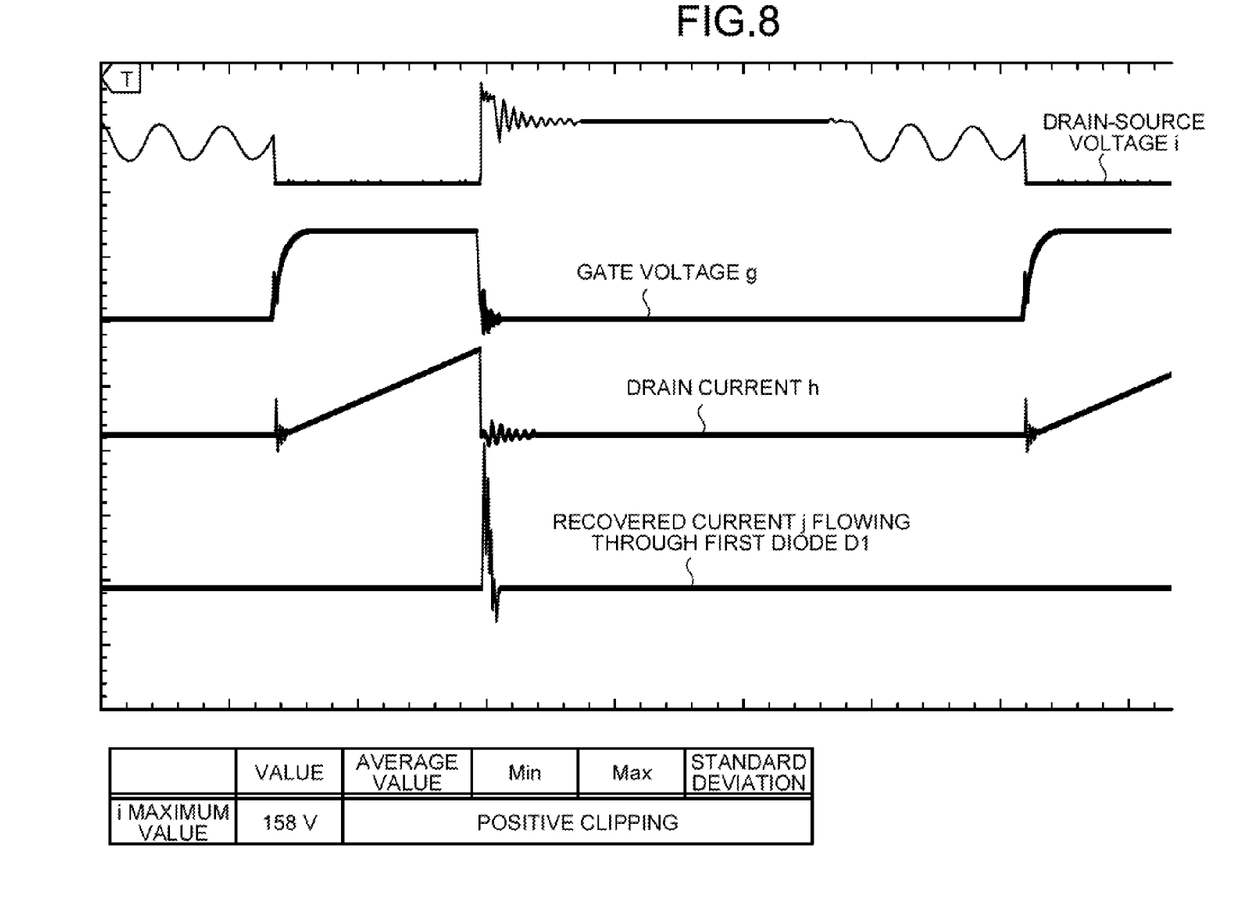
FIG. 8 is a graph illustrating an example of a change in voltage in the case where a first electronic switch and a second electronic switch of the power supply device are operated.

Next, an operation of the power supply device 1*a* will be described. FIG. 8 is a graph illustrating an example of a change in voltage in the case where the first electronic switch S1 and the second electronic switch S2 of the power supply device 1*a* are operated.

As illustrated in FIG. 8, drain-source voltage i of the power supply device 1*a* is about ¼ (158 V) of the drain-source voltage c (572 V) of the flyback converter, illustrated in FIG. 4, not including a snubber circuit. Also, the drain-source voltage i of the power supply device 1*a* is about ½ (158 V) of the drain-source voltage f (310 V) of the flyback converter, illustrated in FIG. 6, including a snubber circuit.

Additionally, a recovered current j that flows through the first diode D1 is current to be recovered by the electrolytic capacitor C1.

Figure 9:
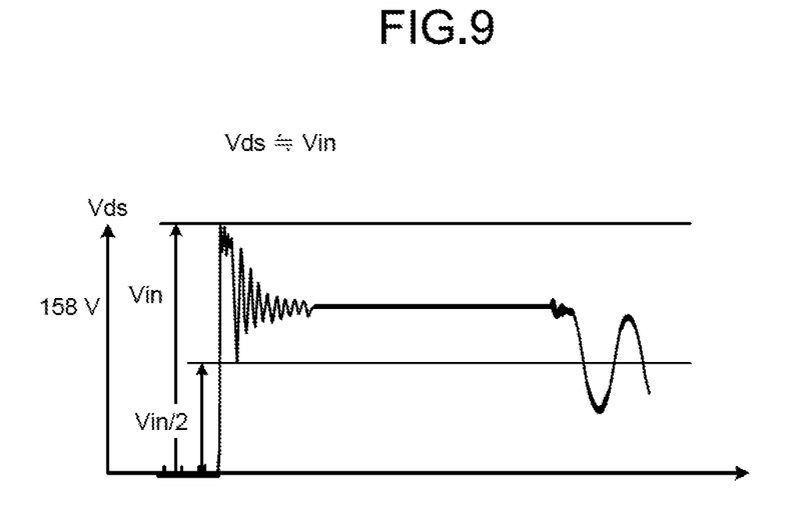
FIG. 9 is a graph illustrating in detail drain-source voltage i illustrated in FIG. 8.

FIG. 9 is a graph illustrating in detail the drain-source voltage i illustrated in FIG. 8. As illustrated in FIG. 9, the spikes are clamped by the first diode D1 and the second diode D2, and the Vds (drain-source voltage i) is about 158 V and is approximately the same as input voltage Vin. Accordingly, it is assumed that the power supply device 1a reduces the stress on the peripheral devices, and that the surge and spike energy is recovered.

Figure 10:
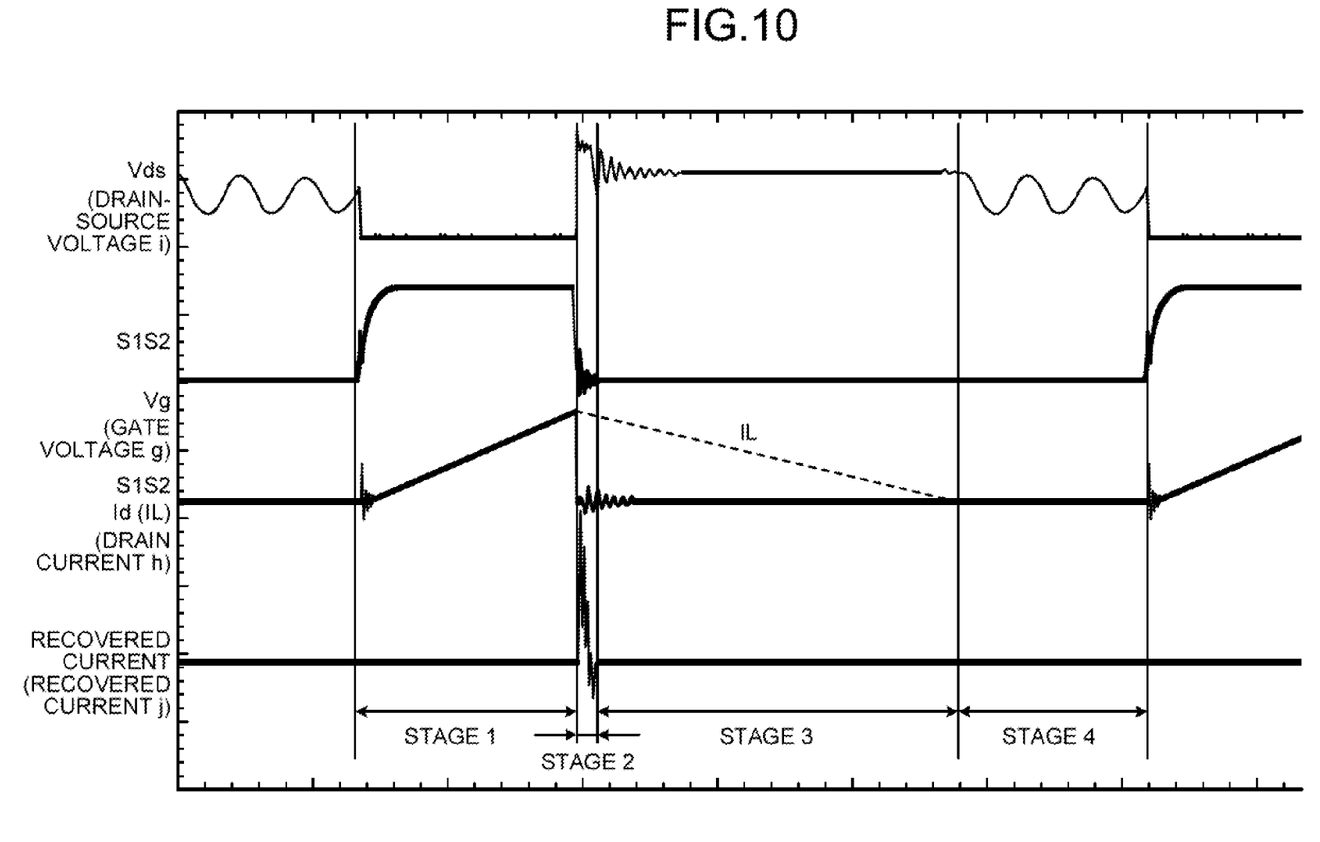
FIG. 10 is a graph illustrating a switching mechanism of the power supply device.

FIG. 10 is a graph illustrating a switching mechanism of the power supply device 1a. In stage 1, the power supply device 1a turns on the first electronic switch S1 and the second electronic switch S2 at the same time, causes current to flow to the primary side of the power converter transformer T1, and causes the power converter transformer T1 to accumulate energy. At this time, an output current does not flow because the third diode D3 is provided in a direction opposite the flow of the current on the secondary side of the power converter transformer T1.

In stage 2, the power supply device 1a turns off the first electronic switch S1 and the second electronic switch S2 at the same time. At this time, since a current of the power converter transformer T1 is abruptly cut off, the self-inductance voltage of the power converter transformer T1 is drastically raised. However, since current flows through the first diode D1 and the second diode D2, current (energy) is recovered by the electrolytic capacitor C1. The output current of the power supply device 1a flows at this time.

In stage 3, the power supply device 1a keeps dissipating the energy accumulated in the inductance on the primary side of the power converter transformer T1. The output current of the power supply device 1a flows at this time.

In stage 4, the output voltage flows although the power supply device 1a is in an idle period. Here, the power supply device 1a may realize stable efficiency properties despite the variation in the leakage inductance.

Second Embodiment

Figure 11:
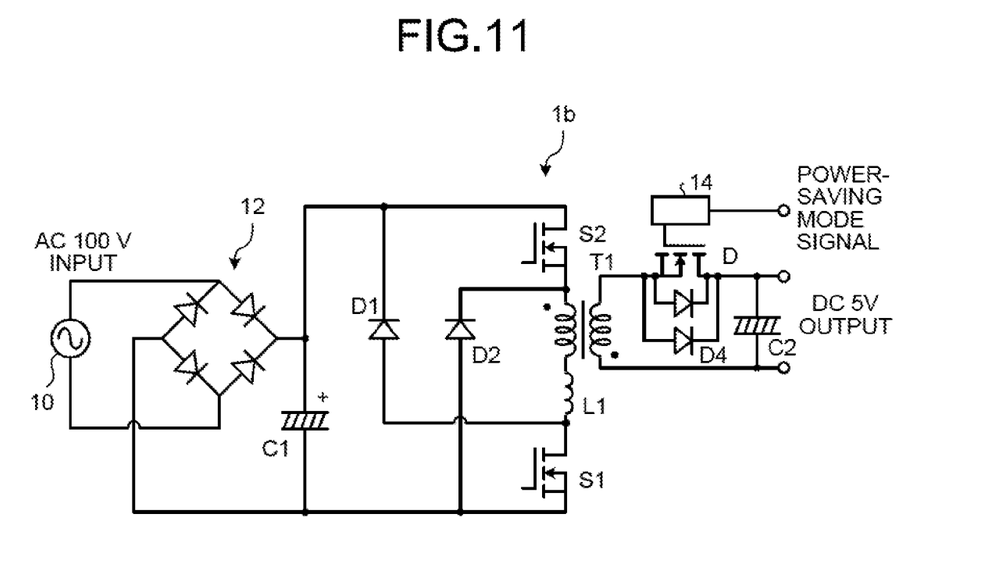
FIG. 11 is a diagram illustrating a structure example of a power supply device according to a second embodiment.

Next, a second embodiment of the power supply device will be described in detail. FIG. 11 is a diagram illustrating a structure example of a power supply device 1b according to the second embodiment. As illustrated in FIG. 11, the power supply device 1b includes a synchronous rectifier circuit D, a fourth diode D4, and a control circuit (synchronous rectifier controller) 14 on the secondary side of the power converter transformer T1. Additionally, with respect to the power supply device 1b illustrated in FIG. 11, portions substantially the same as those of the power supply device 1a illustrated in FIG. 7 are denoted with the same reference signs.

The synchronous rectifier circuit D is structured by a power MOSFET, for example, and causes the output current of the power converter transformer T1 to flow, in synchronization with the first electronic switch S1 and the second electronic switch S2 cutting off the voltage. The power MOSFET acts as if there is a diode (parasitic diode) inside. The fourth diode D4 is a Schottky barrier diode that is provided in parallel with the parasitic diode of the synchronous rectifier circuit D. The control circuit 14 performs control to cut off the synchronous rectifier circuit D according to the size of a load connected to the power converter transformer T1.

With the power supply device 1b, the operating current of the synchronous rectifier circuit D negatively affects the efficiency when the load current is 50 mA (power-saving mode), for example. Accordingly, when a power-saving mode signal indicating that a power-saving mode is specified is received, the control circuit 14 performs control to cut off the synchronous rectifier circuit D. In the case where the synchronous rectifier circuit D is cut off, the fourth diode D4 performs rectification.

The fourth diode D4 is significantly superior to the parasitic diode of the synchronous rectifier circuit D in the forward voltage drop characteristic. Accordingly, the power supply device 1b has improved efficiency in both cases of the rated (heavy-load) driving and the power-saving (light-load) driving. For example, the voltage drop in the forward direction of the fourth diode D4 is preferably 0.6 V or less. Also, a plurality of fourth diodes D4 may be provided.

Figure 12:
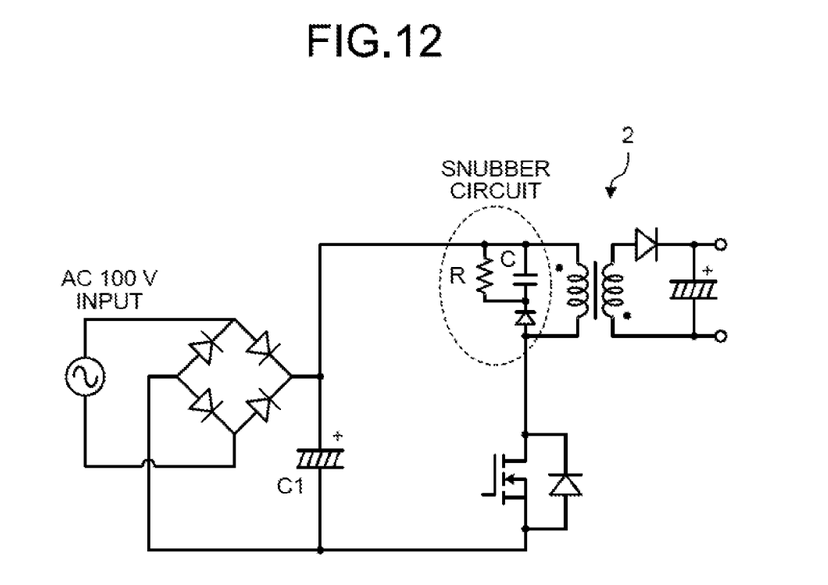
FIG. 12 is a diagram illustrating a comparative example of a power supply device, of a flyback method, including a snubber circuit.
Figure 13:
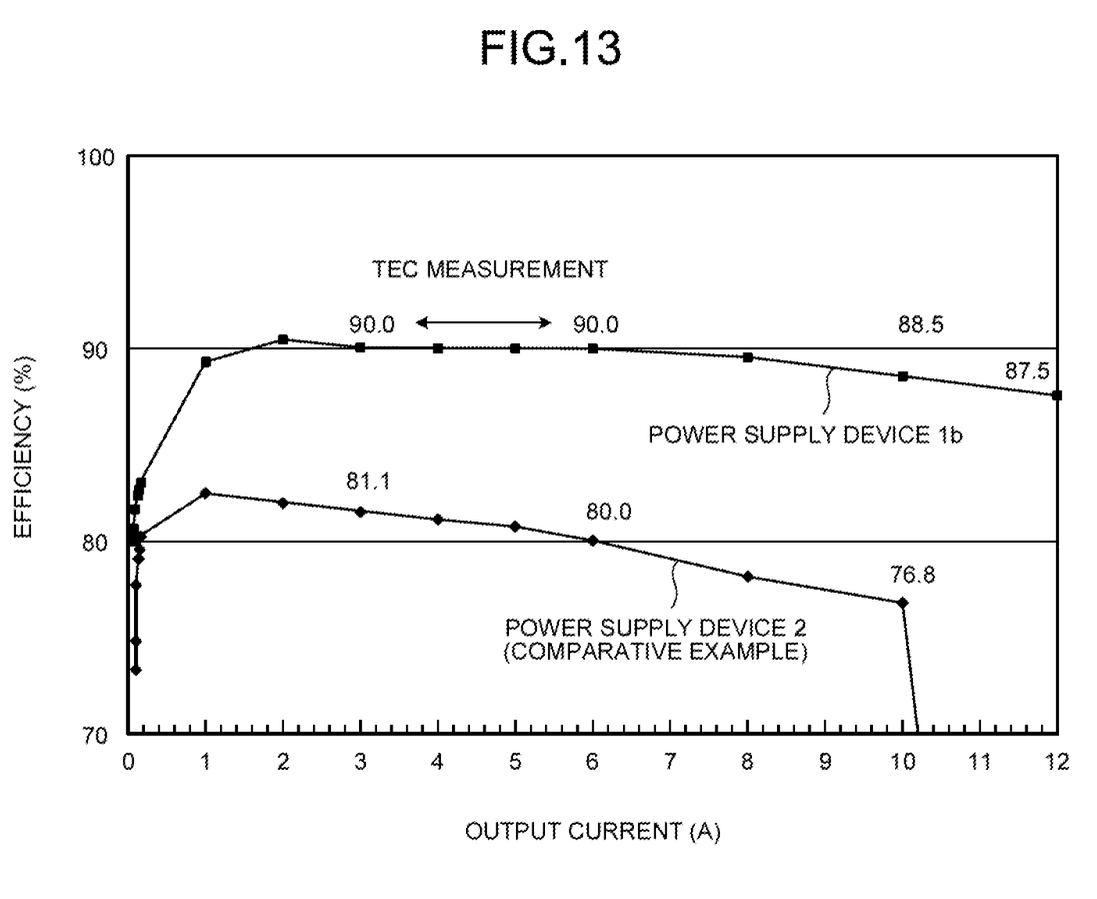
FIG. 13 is a graph illustrating a first example of efficiency improved by the power supply device according to the second embodiment (output current: 0 A to 12 A)
Figure 14:
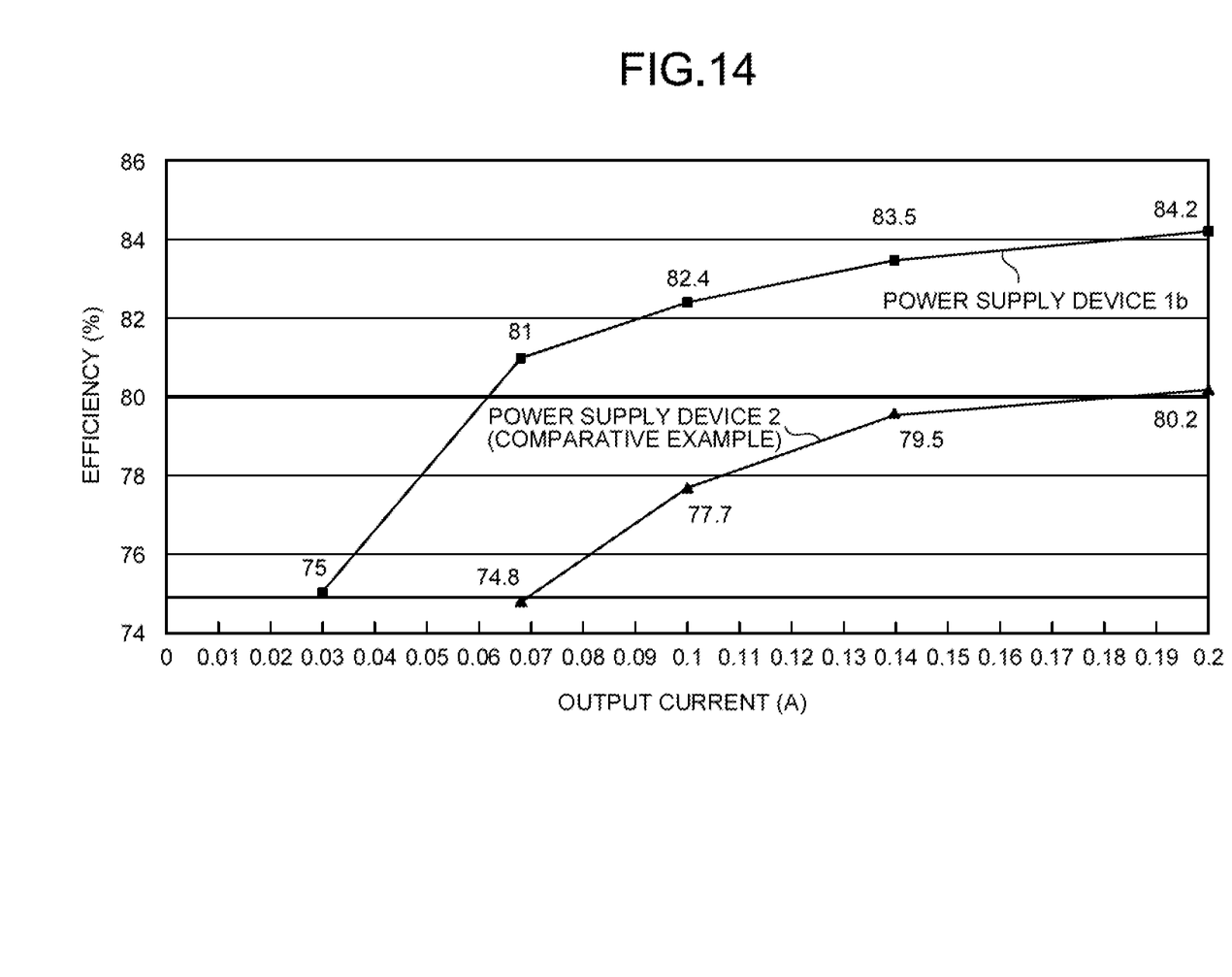
FIG. 14 is a graph illustrating a second example of efficiency improved by the power supply device according to the second embodiment (output current: 0 A to 0.2 A)

Next, the efficiency to be improved by the power supply device 1b will be described. FIG. 12 is a diagram illustrating a comparative example of a power supply device 2, of a flyback method, including a snubber circuit. FIG. 13 is a graph illustrating a first example of efficiency improved by the power supply device 1b according to the second embodiment (output current: 0 A to 12 A). FIG. 14 is a graph illustrating a second example of efficiency improved by the power supply device 1b according to the second embodiment (output current: 0 A to 0.2 A). As illustrated in FIGS. 13 and 14, the efficiency of the power supply device 1b is improved compared to the power supply device 2 (comparative example) with respect to both of the range of the output current 0 A to 12 A and the range of the output current 0 A to 0.2 A.

EXAMPLE

Figure 15:
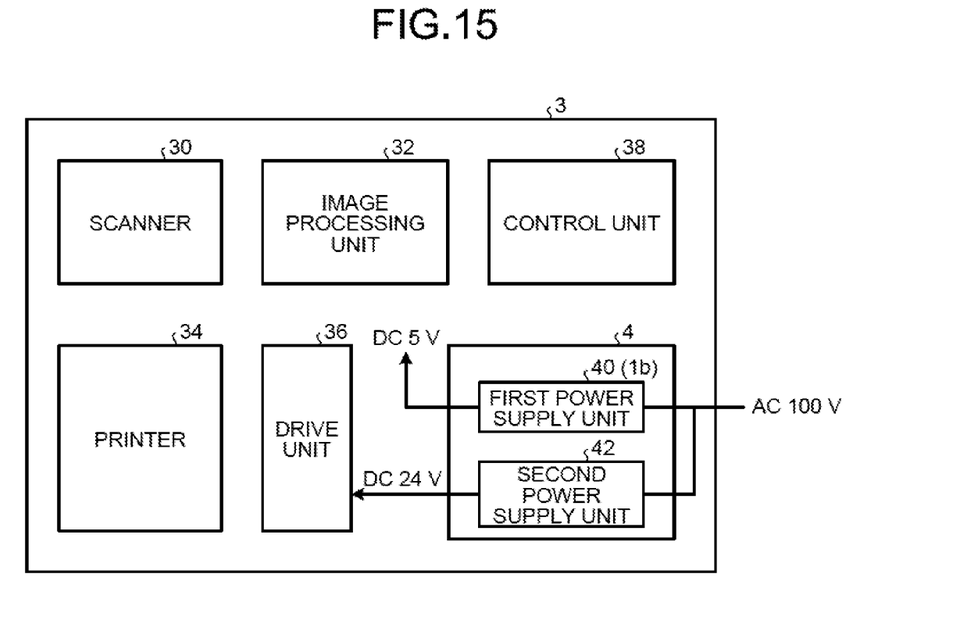
FIG. 15 is a block diagram exemplarily illustrating a structure of an image forming device.

Next, an image forming device 3 provided with the power supply device 1b will be described. FIG. 15 is a block diagram exemplarily illustrating a structure of the image forming device 3. The image forming device 3 is a multi-function peripheral, for example, and includes a scanner 30, an image processing unit 32, a printer (image forming unit) 34, a drive unit 36, a control unit 38, and a power supply device 4.

The scanner 30 reads an image of an original document. The image processing unit 32 performs a predetermined process on the image read by the scanner 30, for example, and outputs the same to the printer 34. The printer 34 prints the image received from the image processing unit 32. The drive unit 36 operates at 24 V, for example, and drives movable portions such as the scanner 30 and the printer 34. The control unit 38 controls each unit structuring the image forming device 3.

The power supply device 4 includes a first power supply unit 40 and a second power supply unit 42, for example. The first power supply unit 40 is the power supply device 1b (or the power supply device 1a) described above, and converts AC power of 100 V to DC power of 5 V, and applies the voltage of 5 V to the control unit 38 or the like in the image forming device 3 which operates at voltage of 5 V. The second power supply unit 42 applies voltage of 24 V on the drive unit 36. Also, in the case where the power-saving mode described with reference to FIG. 11 is specified, the power supply device 4 has the second power supply unit 42 turned off, and only the drive current of about 50 mA at 5 V (DC) output from the first power supply unit 40 is obtained.

As described above, with respect to the image forming device 3, the first power supply unit 40 is the power supply device 1b (or the power supply device 1a), and thus, both the higher efficiency and the miniaturization for the power supply device 4 are achieved. Also, the power supply device 1a and the power supply device 1b may be used in an electronic appliance and the like which require power supply of a wide output range from heavy load to light load, such as rated driving, standby driving, and sleep driving, without being restricted to the image forming device 3.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

EXPLANATION OF LETTERS OR NUMERALS 1a, 1b Power supply device
   12 Bridge rectifier (Diode)
   14 Control circuit
   C1 Electrolytic capacitor
   C2 Electrolytic capacitor
   D1 First diode
   D2 Second diode
   D3 Third diode
   D4 Fourth diode
   D Synchronous rectifier circuit
   S1 First electronic switch
   S2 Second electronic switch
   L1 Coil
   T1 Power converter transformer
3 Image forming device
   30 Scanner
   32 Image processing unit
   34 Printer (Image forming unit)
   36 Drive unit
   38 Control unit
4 Power supply device
   First power supply unit
   42 Second power supply unit

The invention claimed is:

1. A power supply device comprising:
   a cut-off unit configured to cut off voltage applied to a primary winding of a transformer, a coil having been connected in series with the primary winding of the transformer such that when a current flows out of the primary winding of the transformer, said current flows from the primary winding to the coil;
   a first circuit including a first diode connected on a primary side of the transformer to cause, in a case where the voltage applied to the primary winding of the transformer is cut off by the cut-off unit, current to flow in such a way that energy accumulated in the transformer is led to a capacitor on the primary side of the transformer, the first diode being connected between (i) the capacitor on the primary side of the transformer that accumulates the energy led from the transformer by the first diode and (ii) the coil in series with the primary winding of the transformer; and
   a second circuit including a second diode connected on the primary side of the transformer to clamp, in a case where the voltage applied to the primary winding of the transformer is cut off by the cut-off unit, voltage of the primary winding and the coil.

2. The power supply device according to claim 1, wherein the cut-off unit includes two electronic switches provided at one end of the primary winding and one end of the coil.

3. The power supply device according to claim 2, wherein at least one of the two electronic switches includes a function for turning on the switch so as to accumulate energy.

4. The power supply device according to claim 1, further comprising:
   a synchronous rectifier circuit configured to cause an output current of the transformer to flow, in synchronization with the cut-off unit cutting off voltage; and
   a Schottky barrier diode that is provided in parallel with a parasitic diode of the synchronous rectifier circuit.

5. The power supply device according to claim 4, further comprising:
   a control circuit configured to perform control to cut off the synchronous rectifier circuit according to a size of a load connected to the transformer.

6. An image forming device comprising:
   an image forming unit configured to form an image;
   a control unit configured to control the image forming unit; and
   a power supply device, the power supply device comprising;
   a cut-off unit configured to cut off voltage applied to a primary winding of a transformer, a coil having been connected in series with the primary winding of the transformer such that when a current flows out of the primary winding of the transformer, said current flows from the primary winding to the coil;
   a first circuit including a first diode connected on a primary side of the transformer to cause, in a case where the voltage applied to the primary winding of the transformer is cut off by the cut-off unit, current to flow in such a way that energy accumulated in the transformer is led to a capacitor on the primary side of the transformer, the first diode being connected between (i) the capacitor on the primary side of the transformer that accumulates the energy led from the transformer by the first diode and (ii) the coil in series with the primary winding of the transformer; and
   a second circuit including a second diode connected on the primary side of the transformer to clamp, in a case where the voltage applied to the primary winding of the transformer is cut off by the cut-off unit, voltage of the primary winding and the coil.

7. The image forming device according to claim 6, wherein
   The cut-off unit includes two electronic switches provided at one end of the primary winding and one end of the coil.

8. The image forming device according to claim 7, wherein at least one of the two electronic switches includes a function for turning on the switch so as to accumulate energy.

9. The image forming device according to claim 6, further comprising:
   a synchronous rectifier circuit configured to cause an output current of the transformer to flow, in synchronization with the cut-off unit cutting off voltage; and
   a Schottky barrier diode that is provided in parallel with a parasitic diode of the synchronous rectifier circuit.

10. The image forming device according to claim 9, further comprising:
    a control circuit configured to perform control to cut off the synchronous rectifier circuit according to a size of a load connected to the transformer.

11. An electronic appliance comprising:
    a cut-off unit configured to cut off voltage applied to a primary winding of a transformer, a coil having been connected in series with the primary winding of the transformer such that when a current flows out of the primary winding of the transformer, said current flows from the primary winding to the coil;

a first circuit including a first diode connected on a primary side of the transformer to cause, in a case where the voltage applied to the primary winding of the transformer is cut off by the cut-off unit, current to flow in such a way that energy accumulated in the transformer is led to a capacitor on the primary side of the transformer, the first diode being connected between (i) the capacitor on the primary side of the transformer that accumulates the energy led from the transformer by the first diode and (ii) the coil in series with the primary winding of the transformer; and a second circuit including a second diode connected on the primary side of the transformer to clamp, in a case where the voltage applied to the primary winding of the transformer is cut off by the cut-off unit, voltage of the primary winding and the coil.

12. The electronic appliance according to claim 11, wherein the cut-off unit includes two electronic switches provided at one end of the primary winding and one end of the coil.

13. The electronic appliance according to claim 12, wherein
at least one of the two electronic switches includes a function for turning on the switch so as to accumulate energy.

14. The electronic appliance according to claim 11, further comprising:
a synchronous rectifier circuit configured to cause an output current of the transformer to flow, in synchronization with the cut-off unit cutting off voltage; and
a Schottky barrier diode that is provided in parallel with a parasitic diode of the synchronous rectifier circuit.

15. The electronic appliance according to claim 14, further comprising:
a control circuit configured to perform control to cut off the synchronous rectifier circuit according to a size of a load connected to the transformer.

* * * * *